E. D. & Z. W. LEE.
Shovel-Plow.
No. 29,389.
Patented July 31, 1860.
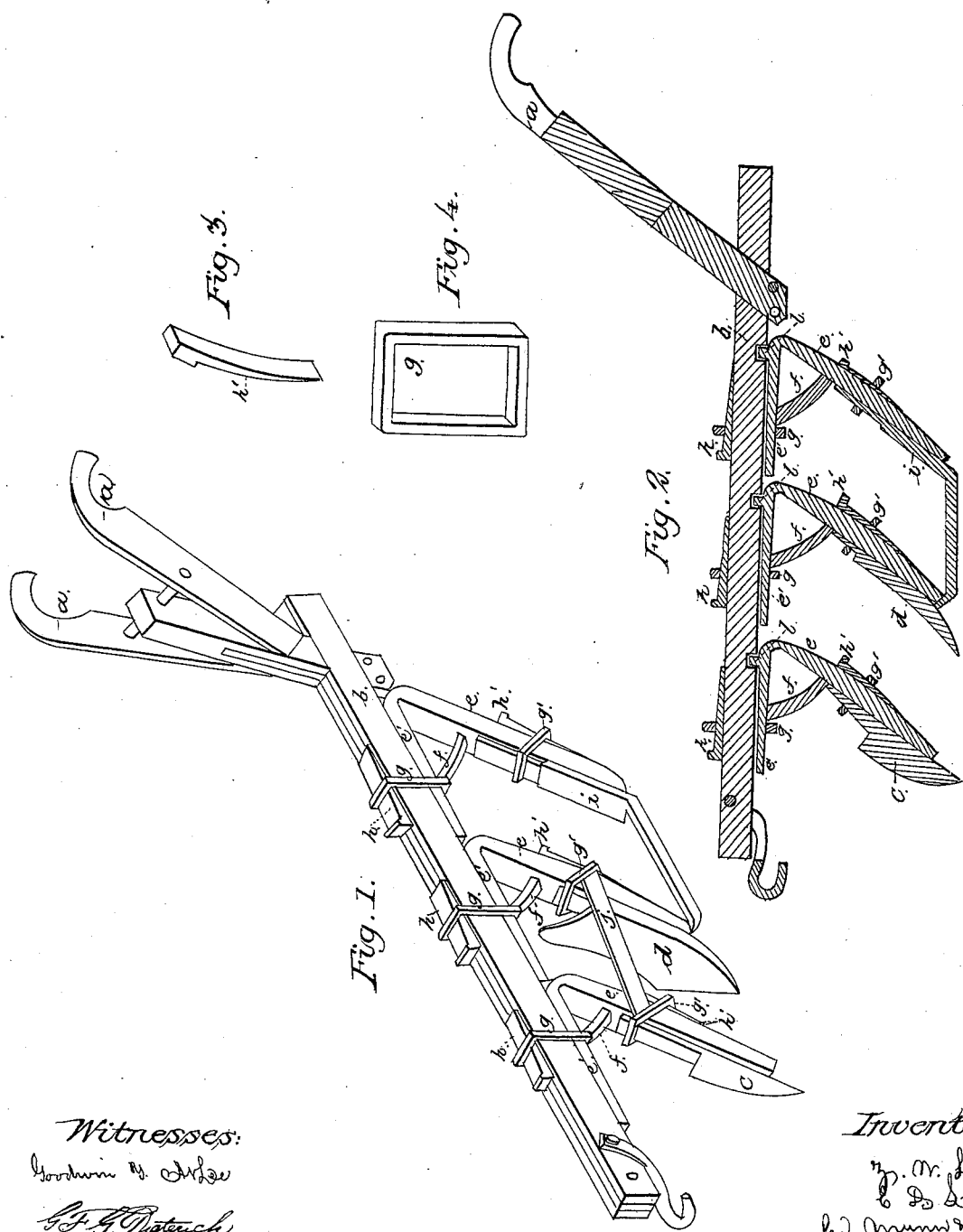

UNITED STATES PATENT OFFICE.

Z. W. LEE AND E. D. LEE, OF BLAKELEY, GEORGIA.

IMPROVEMENT IN CULTIVATORS.

Specification forming part of Letters Patent No. 29,389, dated July 31, 1860.

*To all whom it may concern:*

Be it known that we, Z. W. LEE and E. D. LEE, of Blakeley, in the county of Early and State of Georgia, have invented a new and useful Improvement in Plows; and we do hereby declare that the following is a full, clear, and exact description of the same, reference being had to the accompanying drawings, forming a part of this specification, in which—

Figure 1 represents a perspective view, and Fig. 2 a vertical longitudinal section, of my plow; and Figs. 3 and 4 are perspective views of detached portions of the plow.

Similar letters of reference in each of the several figures indicate corresponding parts.

The nature of our invention consists in combining a plow-beam and three angle-irons with a cutter, $c$, plowshare, and plow-brace, when constructed and arranged in relation to each other as hereinafter to be described, and for the purpose of constituting a very effective and strong plowing implement.

$a\ a$ are the handles, and $b$ is the beam, of the plow.

A number of angle-irons, $e\ e'$, are secured to the plow-beam by means of clamps $g$, which are slipped over the beam and over the shanks of $e'$ of the angle-irons, and are fastened by wedges $h$, as seen in Figs. 1 and 2. The angle-irons are provided with projections $b$, which fit into corresponding notches in the under surface of the beam, so as to prevent the angle-irons from being displaced by sudden shocks or the like. Such angle-irons, of various shapes, and any suitable number of them, can be attached to the under surface, as well as to the sides of the beam, by means of such clamps and wedges, and any kind of plowing implements may be attached to the angle-irons by similar clamps and wedges. By attaching angle-irons to the under surface, and also to the sides of the beam, and securing suitable plows to these angle-irons, the implement can readily be changed into a cultivator.

The plow represented in the drawings is intended for very heavy plowing, breaking new soil, &c.

Three angle-irons, $e\ e'$, are secured to the beam $b$ by clamps $g$ and wedges $h$, as above described. Each of these angle-irons is strengthened by a brace, $f$. A cutter, $c$, a plow, $d$, and a plow-brace, $i$, are fastened to the front, middle, and rear angle-irons, respectively, by means of clamps $g'$ (being slipped over the angle-irons and the shanks of said implements) and wedges $h'$ in a manner similar to the one already described.

The cutter $c$ is intended to cut roots, &c., and prepare the soil for the action of the plow $d$. The cutter and plow are braced together by a cross-bar, $j$, the ends of which are held by the clamps $g'$ of the cutter and plow. These ends of the bar $j$ are notched, so that they cannot slip out of the clamps before the clamps themselves are removed. The rear surface of the plow $d$ rests against the forward end of the brace $i$, and receives thereby additional support.

What we claim as our invention, and desire to secure by Letters Patent, is—

The combination of a plow-beam, $b$, and three angle-irons, $e\ e'\ e\ e'\ e\ e'$, with a cutter, $c$, plowshare $d$, plow-brace $i$, clamps $g$, and wedges $h$, when constructed and arranged in the manner and for the purposes set forth.

The above specification of our improvement in plows signed by us this 2d day of June, 1860.

Z. W. LEE.
      E. D. LEE.

Witnesses:
 GOODWIN Y. AT LEE,
 R. W. FENWICK.